United States Patent [19]

Uso, Jr. et al.

[11] Patent Number: 4,759,963

[45] Date of Patent: Jul. 26, 1988

[54] FISHING POLE FASTENING DEVICE

[76] Inventors: Madrid Uso, Jr., 33206 Carribean Way; Londres Uso, 33176 Trinidad La., both of Dana Point, Calif. 92629

[21] Appl. No.: 51,723

[22] Filed: May 18, 1987

[51] Int. Cl.$^4$ .................... B32B 3/06; A01K 87/00
[52] U.S. Cl. .................... 428/100; 428/35; 43/25; 43/54.1; 2/DIG. 6; 52/DIG. 13; 248/102; 248/205.2; 24/17 AP; 24/304; 24/442; 24/DIG. 11
[58] Field of Search .............. 428/100, 35; 43/25, 43/54.1; 2/DIG. 6; 52/DIG. 13; 248/102, 205.2; 24/17 AP, 304, 306, 442, 450, DIG. 11

[56] References Cited

U.S. PATENT DOCUMENTS

| | | | |
|---|---|---|---|
| 3,370,818 | 2/1968 | Berr | 248/205.2 |
| 3,387,341 | 6/1968 | Mates et al. | 248/205.2 |
| 3,994,048 | 11/1976 | Rosenthal | 24/81 SK |
| 4,003,612 | 1/1977 | Munsell | 312/245 |
| 4,074,397 | 2/1978 | Rosin | 24/73 AS |
| 4,126,951 | 11/1978 | Antonious | 36/54 |
| 4,564,957 | 1/1986 | Scharf | 2/75 |
| 4,576,664 | 3/1986 | Delahaunty | 156/71 |
| 4,640,039 | 2/1987 | O'Neill | 43/21.2 |

OTHER PUBLICATIONS

Versatile Velcro Fasteners, Popular Science, Ray Hill, Jul., 1978, pp. 110–112.

*Primary Examiner*—John E. Kittle
*Assistant Examiner*—Patrick J. Ryan
*Attorney, Agent, or Firm*—Price, Gess & Ubell

[57] ABSTRACT

A universally adaptable fastening device for fastening fishing poles to railings, which has a quick release function is provided by an elasticized band of about one foot long having a Velcro fastening mechanism to secure the two ends together. This band is fastened to the railing. A band of non-stretchable material having a Velcro fastening mechanism to secure the two ends together is permanently attached crosswise to the elasticized band, closer to one end thereof. This band is fastened to the fishing pole.

11 Claims, 2 Drawing Sheets

400;4,759,963

FISHING POLE FASTENING DEVICE

BACKGROUND OF THE INVENTION

1. Field of the Invention

The present invention relates generally to improvements in fishing pole holding devices and more particularly pertains to a new and improved fastening device for holding an unattended fishing pole upright to a railing on a dock or boat.

2. Description of the Prior Art

Straps and bands of all kinds have been utilized to hold a fishing pole in an upright position while unattended on a dock or deck of a boat. The inventors have seen such devices as bungy cords, shoe strings, towels and leather belts used for this purpose. All of these devices have been used in an attempt to solve the longstanding problem of how to keep the fishing pole upright against the railing of a dock or boat when unattended. All of these devices have a major shortcoming. Each must be physically disconnected and removed from the railing in order to disengage the fishing pole from the railing.

SUMMARY AND OBJECTS OF THE INVENTION

An object of the present invention is the provision of a fishing pole fastening device that releases the fishing pole from the rail without having to disconnect the fastening device from the rail.

Another object of the present invention is to provide a mechanism which quickly releases the fishing pole.

A further object of the present invention is the provision of fishing pole fastening device that is adjustable to a variety of rail sizes and construction.

Still another object of the present invention is to provide a fishing pole fastening device that can also function as a fishing rod tie for fastening a number of fishing poles together for ease of transport.

According to the present invention, the foregoing and other objects are attained as follows:

A rubberized first strap having a Velcro fastening mechanism for fastening the two ends together is wrapped around the railing of a dock or boat against which a fishing pole is to be fastened. Permanently attached crosswise to the first strap is a non-stretchable second smaller strap also having a Velcro fastening mechanism for fastening the two ends together. The first strap is positioned so that the second strap is facing towards the inside on the railing. The fishing pole is held fast to the railing by the second strap. Simply pulling one end of the second strap quickly disengages the pole from the railing.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like referenced numerals designate like parts throughout the figures thereof and wherein.

DESCRIPTION OF THE PREFERRED EMBODIMENTS

Figure 1:
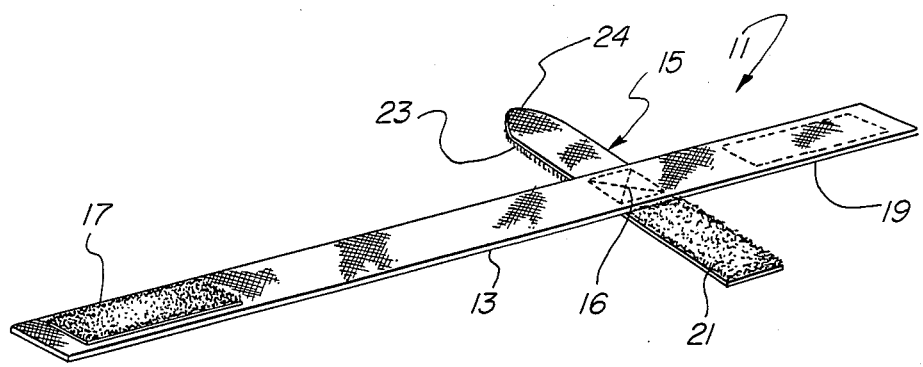
FIG. 1 is a full perspective of a fishing pole fastening device constructed according to the present invention.

The fishing pole fastening device 11 of FIG. 1 is made up of a first strap 13 that is about twelve inches in length. The material of the first strap 13 is elasticized. It is preferred that the material provide a limited amount of stretch without giving up its strength. A woven fabric of elastic and non-stretchable fibers is preferred. First strap 13 is about one inch wide.

Strap 13 should have a fastening mechanism which is preferably a Velcro fastening device as shown in FIG. 1. At one end of first strap 13 a pad felt 17 is fastened to strap 13 by being sewn thereto, for example. At the other end of strap 13 the Velcro hook mechanisms 19 are fastened again by being sewn thereto. The Velcro hook patch 19 is on the end opposite to the felt patch 17. Located between the two ends on the first strap 13, four inches from the end containing the hook patch 19 is a second strap 15 made of an unelasticized, fairly unstretchable, but strong material.

The second strap is about three and one-half inches long and three-quarters of an inch wide. One end of this second strap 24 is rounded and the other end is square. The square end has felt material 21 attached thereto. The rounded end opposite to the felt end has Velcro hooks 23 attached thereto. The second strap 15 is fastened to the first strap 13 by a permanent means such as by sewing 16, for example.

Figure 2:
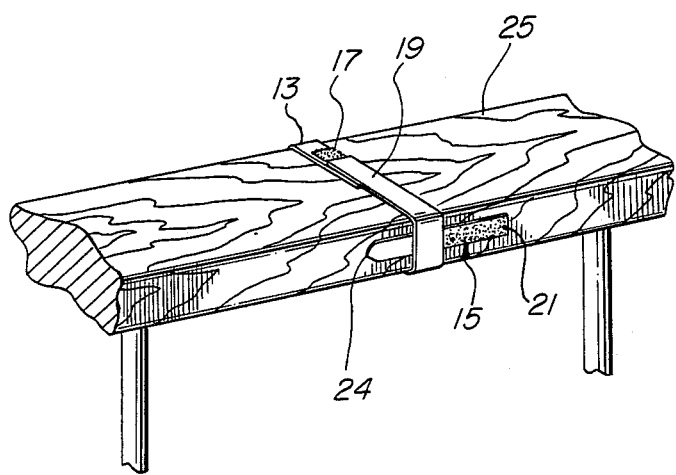
FIG. 2 is a perspective of part of a boat or dock railing with the fastening device attached to the railing.

Referring now to FIG. 2, a method of attaching the fishing pole fastening device 11 of the present invention to the rail of a boat or dock is illustrated. The second strap 15 must be located on the inside of the rail away from the water so that the fishing pole, when leaning against the rail, falls within the ambit of the two ends 24, 21 of the second strap 15. This is accomplished by placing the first strap over the rail so that the Velcro pad 17 is on top of the rail and the hook pad 19 of the first strap overlays the Velcro pad 17. The elasticity of first strap 13 permits for a snug fit on a variety of sizes and shapes of railings.

Figure 3:
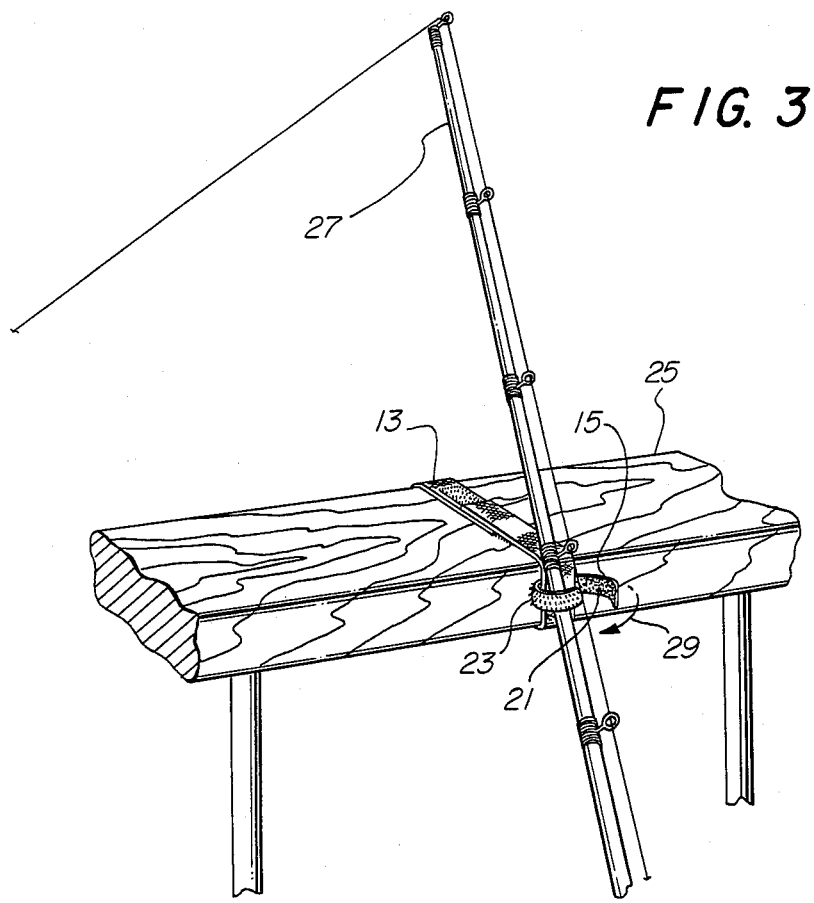
FIG. 3 is a perspective of part of a boat or dock railing with the fastening device attached thereto and a fishing pole positioned to be held by the fastening device.

Referring now to FIG. 3, once the first strap 13 is fastened to the railing 25, the fishing pole 27 may be leaned against the rail 25 and held fast thereto by bringing the rounded end of the second strap 15 with the Velcro hooks thereon around the fishing pole and overlaying the square end with the felt pad 21 thereon in the direction of the arrow 29. The fishing pole can be quickly removed from the grasp of the second strap 15 by simply pulling on the square end to disengage the Velcro grasp.

Figure 4:
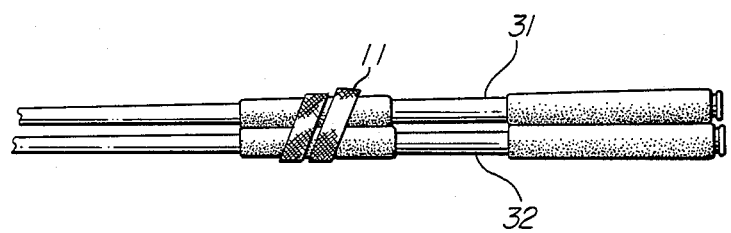
FIG. 4 is a perspective illustrating the use of a fishing pole fastening device to hold a plurality of fishing poles together.

FIG. 4 illustrates another use for the fishing pole fastening device. A plurality of fishing poles 31, 32 may be held together by the fishing pole fastening device 11 by simply wrapping it around the multiple poles 31, 32 and fastening it with the Velcro ends. This Figure also illustrates that the first strap 13 may be just as readily utilized on tubular railings by simply wrapping it around the tubular rail as shown in FIG. 4.

What has been described is a fishing pole fastening device that releases the fishing pole from the rail without having to disconnect the device from the rail;

quickly releases the fishing pole; is adjustable to a variety of rail sizes and construction; and can function as a fastening means to hold a number of pole together for transport.

What is claimed is:

1. A fishing pole fastening device for fastening a pole to the railing of a boat or dock, comprising:

an elasticized strap with a fastening and unfastening mechanism located at its ends for fastening the two ends of the strap together; and an unstretchable strap permanently fastened to the elasticized strap with its length perpendicular to the length of the elasticized strap, said unstretchable strap having a Velcro fastening means at its ends to fasten the two ends together, whereby the elasticized strap is wrapped around and secured to the railing of the boat or dock so that the unstretchable strap faces inward away from the water on the railing, and the pole is secured to the railing when held by the unstretchable strap.

2. The fishing pole fastening device of claim 1 wherein the fastening and unfastening mechanism of the elasticized strap is Velcro.

3. The fishing pole fastening device of claim 1 wherein said unstretchable strap is sewn to said elasticized strap.

4. The fishing pole fastening device of claim 1 wherein said elasticized strap is about one foot in length.

5. The fishing pole fastening device of claim 2 wherein said unstretchable strap is sewn to said elasticized strap.

6. The fishing pole fastening device of claim 5 wherein said elasticized strap is about one foot in length.

7. The fishing pole fastening device of claim 6 wherein said unstretchable strap is about 3½ inches in length.

8. The fishing pole fastening device of claim 7 wherein said elasticized strap is about one inch wide.

9. The fishing pole fastening device of claim 8 wherein said unstretchable strap is about ¾ inch wide.

10. The fishing pole fastening device of claim 9 wherein said unstretchable strap has one rounded end and one square end.

11. The fishing pole fastening device of claim 10 wherein the rounded end of the unstretchable strap has the Velcro hooks and the square end has the felt.

* * * * *